Nov. 27, 1962  K. M. ALLEN ET AL  3,065,777
CLUSTER BREAKER

Filed March 23, 1961  2 Sheets-Sheet 1

INVENTORS.
Kenneth M. Allen
Chester H. Harper
BY Buckhorn, Cheatham & Blore
ATTORNEYS Nov. 27, 1962

K. M. ALLEN ET AL 3,065,777

CLUSTER BREAKER

Filed March 23, 1961

INVENTORS.
Kenneth M. Allen,
Chester H. Harper
BY
Buckhorn, Cheatham & Blore
ATTORNEYS

United States Patent Office 3,065,777
Patented Nov. 27, 1962

3,065,777
CLUSTER BREAKER
Kenneth M. Allen and Chester H. Harper, Newberg,
Oreg., assignors to Allen-Harper, Inc., Portland,
Oreg., a corporation of Oregon
Filed Mar. 23, 1961, Ser. No. 97,835
7 Claims. (Cl. 146—1)

The present invention comprises a cluster breaker for separating clusters of stemmed fruit without pulling the stems from the fruit or bruising the fruit. Preferably the present invention is utilized in conjunction with a vibratory conveyor table having a supporting surface to which is imparted an oscillatory feeding motion to advance the fruit in a feeding direction, but the invention may be utilized in conjunction with any type of conveying means having a supporting surface above which the cluster breaker may be mounted.

The principal object of the present invention is to provide cluster breaker means which will not bruise the fruit while separating the clusters, nor tear the stems from the fruit.

A further object of the present invention is to provide cluster breaker means which is effective to secure separation of all clusters among the fruit progressed through it.

In accordance with the present invention, the term "fruit" may include a variety of items, the principal item for which the invention finds greatest utility being stemmed cherries. Another item to which the invention may be applicable is hops, which also tends to cluster and are fruit even though not ordinarily thought of as such.

The objects and advantages of the present invention will be more readily understood by reference to the accompanying drawing wherein like numerals refer to like parts throughout and in which a preferred form of the invention is illustrated.

The invention is illustrated herein as being utilized in conjunction with a vibrating conveyor of the type disclosed in our Patent No. 2,899,044, issued August 11, 1959, and our co-pending application Serial No. 56,394, filed September 16, 1960, but it is to be appreciated that any other suitable conveying mechanism having a supporting surface upon which fruit may be progressed in a feeding direction may be utilized in conjunction with the present invention.

Figure 1:
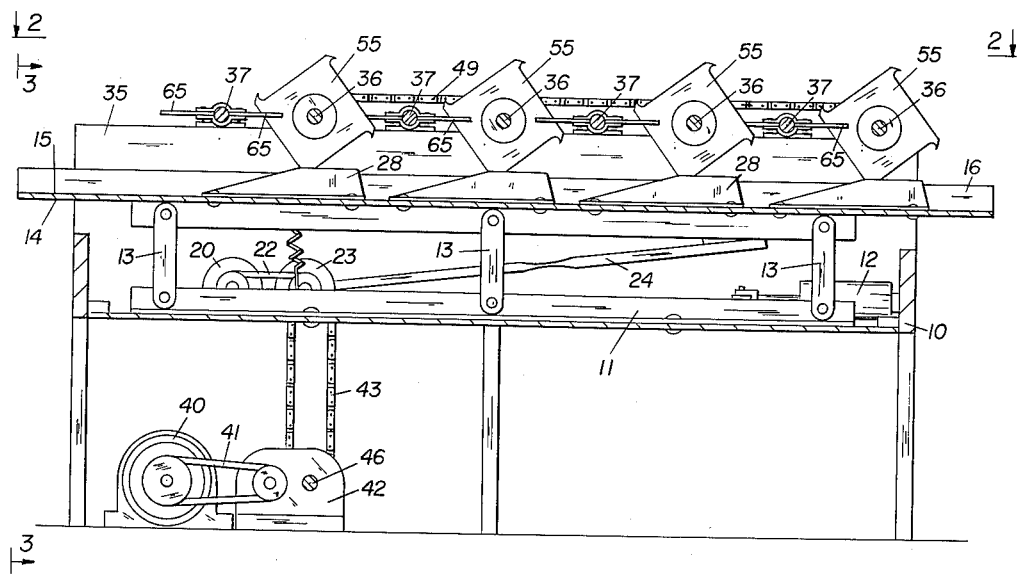
FIG. 1 is a longitudinal vertical section through a machine embodying the present invention, taken substantially along line 1—1 of FIG. 2.
Figure 2:
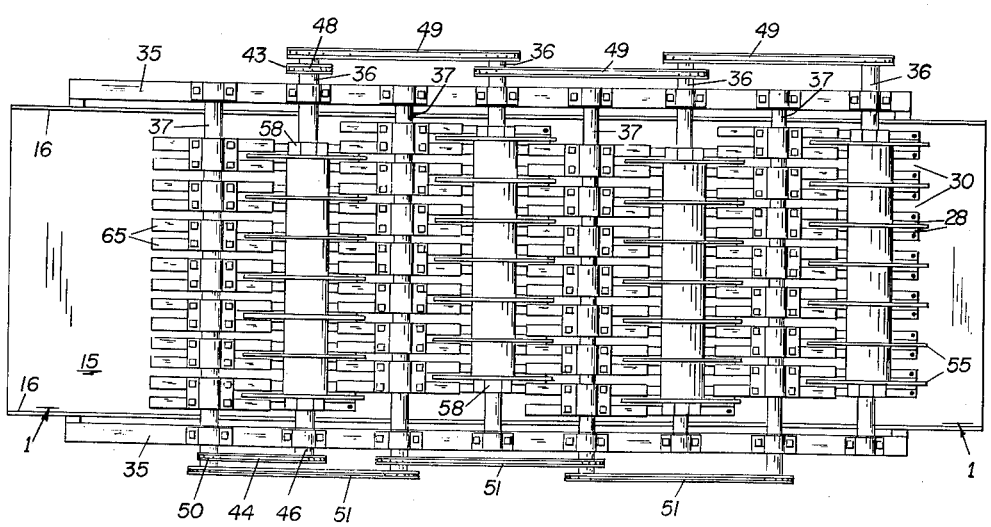
FIG. 2 is a plan view of the machine of FIG. 1, taken substantially from the plane of the line 2—2 of FIG. 1.
Figure 3:
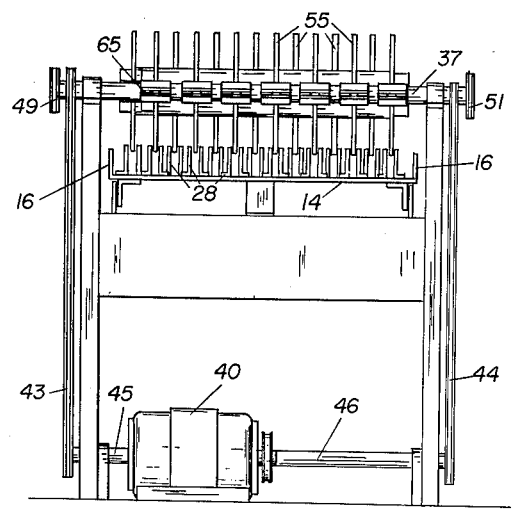
FIG. 3 is an end view of FIG. 1, taken substantially from the plane 3—3 of FIG. 1, with certain parts eliminated as not being necessary to an understanding of the present invention.
Figure 4:
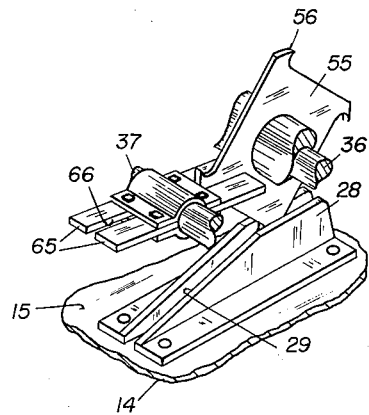
FIG. 4 is a view, in perspective, on an enlarged scale, of an individual cluster breaking mechanism of the present invention.
Figure 5:
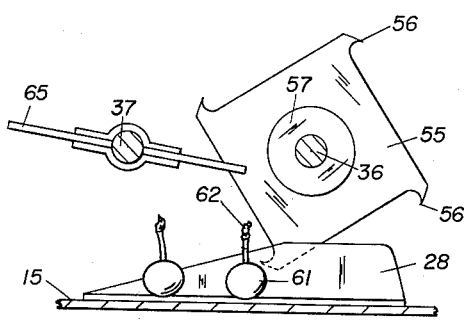
FIG. 5 is an end elevation corresponding to FIG. 4, showing the parts of the cluster-breaking mechanism in one relationship.

According to the present disclosure the conveying mechanism comprises a frame 10 supporting a longitudinally adjustable subframe 11 which may be moved longitudinally by means of a piston and cylinder device 12 to vary the rate of feeding. The subframe is pivotally connected to a plurality of upright supporting links 13, the upper ends of which are pivotally connected to a conveyor table 14 having a horizontally disposed conveying surface 15 and lateral flanges 16 to confine the fruit thereon. An oscillatory vibrating motion is imparted to the table 14 by means including a motor 20, belt driving means 22, off-balance rotor means 23 and a connecting rod 24, as fully set forth in the aforesaid patent and application, whereby materials placed on the conveying surface 15 are progressed longitudinally from left to right in FIG. 1.

In accordance with the present invention a plurality of ramp elements 28 are mounted above the conveying surface and upon or closely adjacent thereto, the elements extending upward at acute angles in the feeding direction. The ramp elements are mounted in closely adjacent pairs on a plurality of transverse rows, defining a plurality of slots 29 which are too narrow to permit the passage of individual fruit. Each pair of ramp elements is offset from adjacent pairs to define wider slots 30 through which fruit may pass. Individual pairs of ramp elements in each transverse row of a plurality of transverse rows are staggered with respect to the elements of adjacent rows. The tendency is for clusters of the fruit to straddle a single pair of ramp elements, with the forks of the clusters being positioned above the slots 29. Any clusters which escape the first row of ramp elements will be caught by the ramp elements on one of the succeeding rows. The ramp elements 28 in the present instance are fixed directly to the surface 15 as by means of rivets, as illustrated, but it is to be appreciated that the same type of ramp element may be fixedly mounted closely adjacent the upper surface of some other type of conveyor means, such as a belt.

The frame 10 includes outer side walls 35 which rise above the flanges 16 on each side of the conveyor table and provide supports for the bearings of a plurality of transverse shafts. The transverse shafts include a plurality of alternately positioned cluster hook shafts 36 and paddle shafts 37. All of the shafts rotate in the same direction counter to the direction of feeding movement, and the paddle shafts are in advance of the corresponding cluster hook shafts. The shafts are driven by means including the motor 40, belt means 41, reduction gear means 42, and sprocket chain means 43 and 44. The sprocket chain means 43 is driven by shaft 45 extending in one direction laterally from the reduction gear means 42, and the sprocket means 44 is driven by shaft 46 extending in the opposite direction from the reduction gear means. The sprocket means 43 includes a sprocket 48 on the first cluster hook shaft 36 and the subsequent cluster hook shafts are connected to the first shaft by sprocket chain means 49 of such character that all cluster hook shafts are driven at the same speed. The sprocket chain means 44 includes a sprocket 50 on the first paddle shaft 37 and the subsequent paddle shafts are connected to the first shaft by sprocket chain means 51 of such character that all paddle shafts are driven at the same speed. In the illustrated embodiment of the invention the paddle shafts rotate twice as fast as the cluster hook shafts. It is to be appreciated that relatively slow rotation is desired, such as in the order of one to ten revolutions per minute.

Figure 7:
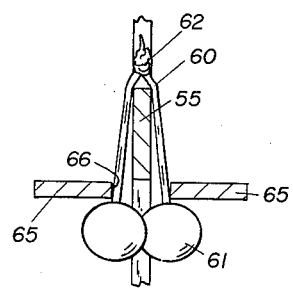
FIG. 7 is a view, on a further enlarged scale, taken substantially along the line 7—7 of FIG. 6.
Figure 6:
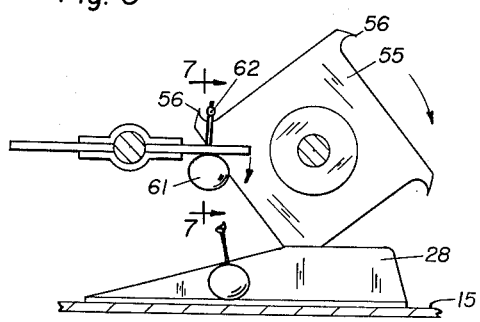
FIG. 6 is a view similar to FIG. 5 showing the parts in a succeeding stage.

Each cluster hook shaft 36 has fixed thereto a plurality of cluster hook plates 55, each comprising a rectangular plate having a plurality of peripheral hooks 56 at the corners thereof. The plates are maintained in radial relation to the shaft by suitable spacers 57 and end collars 58, the individual cluster hook plates 55 thereby being constrained to rotate within the slots 29 respectively beneath each of the shafts. As seen in FIG. 7, the plates 55 are of substantial width, being preferably wider than the stems 60 of the fruit 61 so that the edges of the hook portions of each plate exert spreading pressures against the fork 62 of a cluster picked up by the hook.

A plurality of pairs of paddles 65 are fixed to each of the paddle shafts 37, the paddles extending oppositely in pairs and in alignment along the shaft. Each pair of paddles defines a slot 66 of somewhat greater width than the thickness of the plate 55 but substantially equal to or lesser in width than the diameter of the fruit upon which the machine is operating. The pairs of paddles are arranged to straddle the plates 55 of the adjacent cluster hook shaft in the direction of feeding. Due to the difference in speeds of rotation, a pair of paddles will rotate past each of the hooks on each of the cluster hook plates, moving downwardly with relation to the upwardly rising hooks. The stems 60 of a cluster engaged on any hook will be engaged by the inner edges of the paddles 65 and forced inwardly and downwardly, the upper edges of the hook exerting a splitting force against the fork 62. Therefore, the clusters will be broken apart at the forks before the paddles engage the fruit 61 with any bruising force. Even if an occasional cluster is not broken apart by the time the paddles engage the fruit, the slow motion of the paddles and hooks avoids bruising the fruit, the paddles merely pushing the fruit downwardly until the edges of the hook spread the fork to such an extent that it is broken apart. The separate fruit with the stems attached drop onto the conveyor surface within the slots 30 and continue toward the exit end of the machine.

Having illustrated and described a preferred embodiment of the invention, it should be apparent to those skilled in the art that the invention permits of modification in arrangement and detail. We claim as our invention all such modifications as come within the true spirit and scope of the following claims.

We claim:

1. A cluster breaker for separating clusters of stemmed fruit comprising a conveyor having a fruit supporting surface, means to impart a feeding motion to said conveyor for advancing fruit supported thereon in one direction, a plurality of ramp elements above said surface, said elements rising acutely with relation to said surface in the feeding direction, said elements being arranged in a row across said conveyor in transverse alignment with respect to the feeding direction and being alternately closely and widely spaced, thus providing alternate narrow slots which are too narrow for the passage of fruit and wide slots through which fruit may pass, a first transverse shaft above said ramp elements and rotating counter to the direction of feeding, a plurality of cluster hooks fixed to said first shaft and extending radially therefrom in individual alignment with said narrow slots for engaging the forks of fruit clusters straddling said narrow slots and elevating said clusters, a second transverse shaft in advance of said first shaft and rotating in the same direction, a plurality of paddles extending radially from said second shaft and passing downwardly on opposite sides of said cluster hooks while said cluster hooks are moving upwardly, said cluster hooks having substantial width whereby the lateral edges thereof exert splitting pressure against the fork of a cluster engaged thereby when the stems of the cluster are depressed by said paddles, and means to rotate said shafts in timed relation to each other.

2. A cluster breaker for separating clusters of stemmed fruit comprising a vibrating conveyor table having a fruit supporting surface, means to impart an oscillatory feeding motion to said table for advancing fruit supported thereon in one direction, a plurality of narrow ramp elements fixed to said surface, said elements rising acutely with relation to said surface in the feeding direction, said elements being arranged in a row across said table in transverse alignment with respect to the feeding direction and being alternately closely and widely spaced, thus providing alternate narrow slots which are too narrow for the passage of fruit and wide slots through which fruit may pass, a first transverse shaft above the high points of said ramp elements and rotating counter to the direction of feeding, a plurality of transversely aligned cluster hooks fixed to said first shaft and extending radially therefrom in individual alignment with said narrow slots for engaging the forks of fruit clusters straddling said narrow slots and elevating said clusters, a second transverse shaft in advance of said first shaft and rotating in the same direction, a plurality of transversely aligned paddles extending radially from said second shaft and passing downwardly on opposite sides of said cluster hooks while said cluster hooks are moving upwardly, and means to rotate said shafts in timed relation to each other.

3. A cluster breaker for separating clusters of stemmed fruit comprising a vibrating conveyor table having a fruit supporting surface, means to impart an oscillatory feeding motion to said table for advancing fruit supported thereon in one direction, a plurality of narrow ramp elements fixed to said surface, said elements rising acutely with relation to said surface in the feeding surface, said elements being arranged in a row across said table in transverse alignment with respect to the feeding direction and being alternately closely and widely spaced, thus providing alternate narrow slots which are too narrow for the passage of fruit and wide slots through which fruit may pass, a first transverse shaft above said ramp elements and rotating counter to the direction of feeding, a plurality of transversely aligned cluster hooks fixed to said first shaft and extending radially therefrom in individual alignment with said narrow slots for engaging the forks of fruit clusters straddling said narrow slots and elevating said clusters, a second transverse shaft in advance of said first shaft and rotating in the same direction, a plurality of transversely aligned paddles extending radially from said second shaft and passing downwardly on opposite sides of said cluster hooks while said cluster hooks are moving upwardly, and means to rotate said shafts in timed relation to each other, each of said hooks being centrally disposed with relation to adjacent paddles and each having substantial width but being substantially narrower than the space between adjacent paddles.

4. A cluster breaker for separating clusters of stemmed fruit comprising a vibrating conveyor table having a fruit supporting surface, means to impart an oscillatory feeding motion to said table for advancing fruit supported thereon in one direction, a plurality of narrow ramp elements fixed to said surface, said elements rising acutely with relation to said surface in the feeding direction, said elements being arranged in a row across said table in transverse alignment with respect to the feeding direction and being alternately closely and widely spaced, thus providing alternate narrow slots which are too narrow for the passage of fruit and wide slots through which fruit may pass, a first transverse shaft above the high points of said ramp elements and rotating counter to the direction of feeding, a plurality of transversely aligned cluster hooks fixed to said first shaft and extending radially therefrom in individual alignment with said narrow slots for engaging the forks of fruit clusters straddling said narrow slots and elevating said clusters, a second transverse shaft in advance of said first shaft and rotating in the same direction, a plurality of transversely aligned paddles extending radially from said second shaft and passing downwardly on opposite sides of said cluster hooks while said cluster hooks are moving upwardly, and means to rotate said shafts in timed relation to each other, each of said hooks being centrally disposed with relation to adjacent paddles and each having substantial width but being substantially narrower than the space between adjacent paddles, the spaces between adjacent paddles each being slightly wider than the diameter of a predetermined size of fruit.

5. A cluster breaker comprising means to progress stemmed fruit which tend to cluster in a feeding direction, a pair of acutely inclined ramp plates extending in the direction of feeding and defining a slot too narrow for a single fruit to pass through, a cluster hook rotatably mounted above said ramp plates and rotating counter to the direction of feeding whereby a cluster straddling said slot is elevated by said cluster hook, and a pair of paddles rotatably mounted in advance of said cluster hook and rotating in the same direction, said paddles straddling said cluster hook and engaging the stems of a cluster suspended therefrom, said cluster hooks having substantial width whereby the lateral edges thereof exert splitting pressure against the fork of a cluster when the stems thereof are depressed by said paddles whereby to break the stems of the cluster apart from each other.

6. A cluster breaker comprising means to progress stemmed fruit which tend to cluster in a feeding direction, a pair of acutely inclined ramp plates extending in the direction of feeding and defining a slot too narrow for a single fruit to pass through, a cluster hook rotatably mounted above said ramp plates and rotating in the direction of feeding counter to said direction of feeding whereby a cluster straddling said slot is elevated by said cluster hook, and a pair of paddles rotatably mounted in advance of said cluster hook and rotating in the same direction, said paddles straddling said cluster hook and engaging the stems of a cluster suspended therefrom to break the stems of the cluster apart from each other, said cluster hook having susbstantial width and said paddles being spaced laterally from the sides of said cluster hook slightly more than the thickness of the stems of a cluster whereby said cluster hook and paddles exert a splitting force at the fork of the cluster.

7. A cluster breaker comprising means to progress stemmed fruit which tend to cluster in a feeding direction, a pair of acutely inclined ramp plates extending in the direction of feeding and defining a slot too narrow for a single fruit to pass through, a cluster hook plate having a plurality of peripheral cluster hooks thereon rotatably mounted above said ramp plates and rotating counter to the direction of feeding whereby a cluster straddling said slot is elevated by said cluster hook, a pair of paddles rotatably mounted in advance of said cluster hook and rotating in the same direction, said paddles straddling said cluster hook and engaging the stems of a cluster suspended therefrom to break the stems of the cluster apart from each other, said cluster hook having substantial width and said paddles being spaced therefrom whereby the stems of a cluster suspended on said hook may be depressed between said hook and said paddles and cause the edges of said hook to exert splitting pressure on the fork of the cluster, and means to rotate said paddles at a greater speed than said cluster hooks.

References Cited in the file of this patent
UNITED STATES PATENTS 2,487,911    Wehn _____ Nov. 15, 1949
2,825,375    Gotelli et al. _____ Mar. 4, 1958